Feb. 7, 1961

P. A. SULLIVAN 2,971,169

PULSE POSITION MODULATION SYSTEMS

Filed Dec. 30, 1957

INVENTOR
PAUL A. SULLIVAN
BY Elmer J. Gorn
ATTORNEY 2,971,169

PULSE POSITION MODULATION SYSTEMS

Paul A. Sullivan, West Roxbury, Mass., assignor to Raytheon Company, a corporation of Delaware Filed Dec. 30, 1957, Ser. No. 706,132

3 Claims. (Cl. 332—9)

This invention relates generally to pulse systems and more particularly to pulse position modulation systems.

Pulse position modulation systems provide pulse signals the positions of which on a time basis vary in accordance with the amplitude of a modulating signal. Pulse position modulation is usually accomplished by generating a train of input pulses having approximately equivalent shapes by means of a delay line system and feeding these input pulses to a modulation system that is made up of an array of vacuum tubes or transistors. This invention does away with the necessity of using vacuum tubes or transistors to accomplish the modulation. This invention utilizes a system of diodes, preferably silicon diodes for instance, in conjunction with a simple configuration of resistance, condenser and inductance elements to accomplish the same result as vacuum tube or transistor circuits. Such a system offers simplicity of construction and operation with an accompanying decrease in size, weight and cost over prior systems. Because of the lack of vacuum tubes or transistors improved circuit stability is maintained giving improved reliability and life expectancy.

Figure 1:
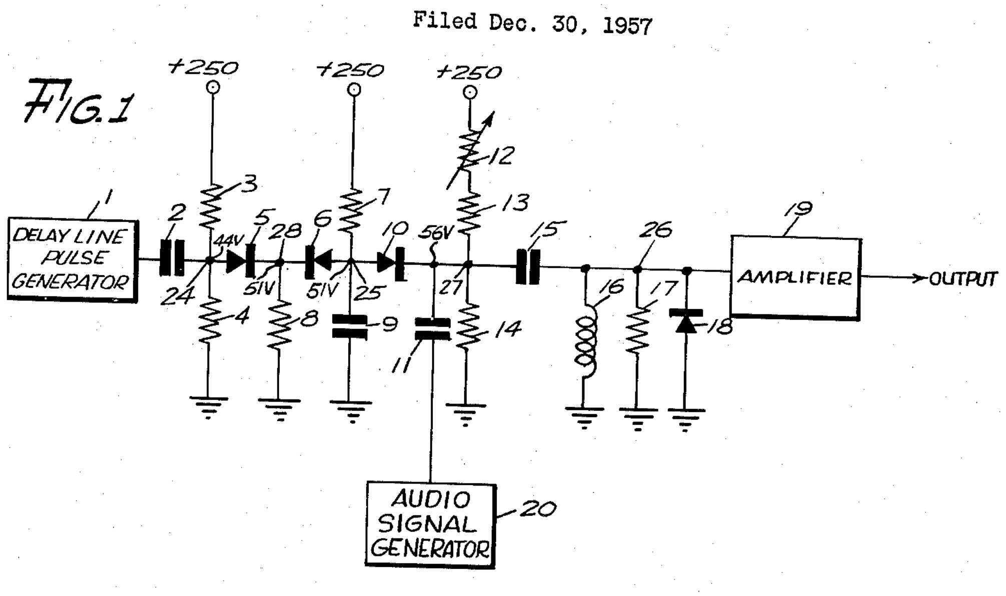
Figure 2:
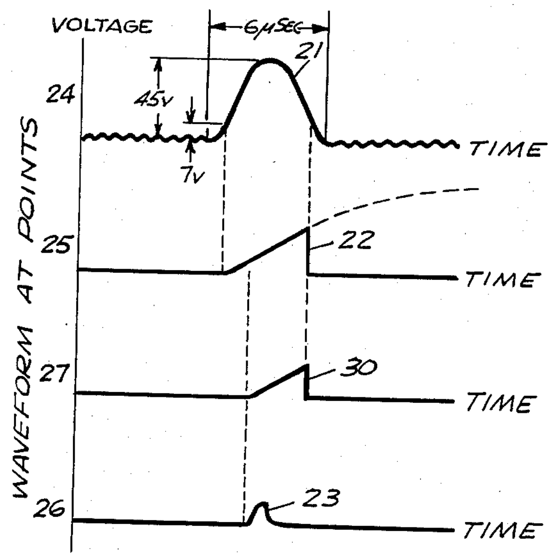

The operation of the system disclosed by this invention can be best described with the help of the accompanying figures in which:

Fig. 1 shows a partial schematic and partial block diagram of a specific embodiment of the invention; and Fig. 2 shows the voltage waveforms at various points within the system.

In Fig. 1 a delay line pulse generator 1 is coupled by means of condenser 2 to the point 24 at the junction of resistors 3 and 4. The other end of resistor 3 is connected to a source of B+ voltage which for this particular embodiment may be 250 volts, and the other end of resistor 4 is connected to ground. Point 24 is also connected to the plate of diode 5, the cathode of which is connected to the cathode of diode 6 and to one end of resistor 8. The other end of resistor 8 is connected to ground. The plate of diode 6 is connected to point 25 at the junction of resistor 7 and condenser 9. The other end of condenser 9 is connected to ground. The point 25 is also connected to the plate of diode 10, the cathode of which is connected to point 27 at the junction of resistors 13 and 14. The other end of resistor 13 is connected to variable resistor 12 and, thence, to the B+ source. The other end of resistor 14 is connected to ground. The point 27 is also connected to one end of condenser 15 the other end of which is connected to point 26 at one end of the parallel combination of inductance 16, resistor 17, and the cathode of diode 18. The other ends of inductance 16 and resistor 17 and the plate of diode 18 are connected to ground. Point 26 is connected to an amplifier 19 which may be the grid of a vacuum tube or to a transistor which provides the desired output. The audio signal generator 20 is coupled by means of condenser 11 to the point 27 at the cathode of diode 10 to provide the modulating voltage.

In Fig. 2 waveform 21 represents an input voltage pulse supplied at the point 24 by the generator 1. Waveform 22 represents the sawtooth wave at point 25 which gives rise to the sawtooth waveform 30 at the point 27. The voltage pulse 23 represents the waveform that is fed to amplifier 19 at the point 26. The position in time of pulse 23 is determined by the value of the audio voltage as explained in the explanation of the operation of the modulation system that follows.

The voltage values shown in Figs. 1 and 2 and those contained in the system description are not to be construed as being limited to the particular values mentioned but are only representative of one specific embodiment of the invention. Other values can be chosen for other operational conditions of the invention.

The input pulses are generated by delay line generator 1. For the particular embodiment described the input pulses arrive at the point 24 at an 8 kc. rate and the pulse width is approximately 6 microseconds with a pulse height of approximately 45 volts. An example of an input pulse is shown by waveform 21 in Fig. 2. Before the arrival of a pulse, the D.-C. voltage levels at various points in the circuit are fixed, for example, as follows. The D.-C. level at point 24, as determined by the values of resistors 3 and 4, is set at 44 volts. The D.-C. level at point 25, as determined by the values of resistors 7 and 8, is set at 51 volts. Thus, the diode 5 is non-conducting and the diode 6 is conducting, before the arrival of an input pulse. The D.-C. level at point 27, as determined by values of the combination of variable resistance 12 and fixed resistances 13 and 14, is set at a value between 54 and 58 volts. Variable resistance 12 may be used to adjust the D.-C. level at point 27, usually at or near a center point of 56 volts. Variable resistance 12 may be omitted and a fixed resistance divider may be used to set up the desired value of voltage. Because the voltage level at point 27 is higher than that at point 25, diode 10 is non-conducting. The D.-C. level at point 26 at the input of the amplifier 19 is normally at ground potential so that diode 18 conducts only when the point 26 is negative with respect to ground.

The input pulse, as represented by pulse 21 shown in Fig. 2, is fed through coupling condenser 2 to the point 24. When the pulse level rises to a value of 7 volts or greater, diode 5 conducts thereby causing point 28 at the junction of diodes 5 and 6 to rise in accordance with the point 24. The point 25 attempts to rise at the same rate but is prevented from doing so by the action of the condenser 9 which tends to hold the value at 51 volts. As soon as the point 28 rises to a value higher than point 25 diode 6 becomes non-conductive. Since condenser 9, therefore, has no path through which to discharge, it will charge exponentially toward a value of 250 volts at a rate determined by the values of resistance 7 and condenser 9. The initial portion of the charging voltage is linear and is represented by the rising portion 29 of the sawtooth wave 22 shown in Fig. 2.

When the voltage at point 25 reaches a value of 56 volts or greater, diode 10 conducts and the voltage at point 27 follows the rising voltage at point 25. The voltage wave form 30 at point 27 is shown in Fig. 2. The combination of condenser 15 and inductance 16 operates on the leading edge of the voltage sawtooth wave 30 to produce a pulse at point 26 as shown by the pulse wave form 23 in Fig. 2. It is believed that inductance 16 and condenser 15 operate to cause the equivalence of a double differentiation so that the leading edge of the sawtooth is essentially an impulse the value of which is determined by the slope of the rising portion, or leading edge, of sawtooth wave 30.

The slope may be set for a value of 2 volts/microsecond. When the input voltage pulse drops to a point at which the voltage at point 28 becomes lower than the voltage at point 25, diode 6 begins to conduct again and the voltage at point 25 drops sharply as shown at the trailing edge of sawtooth waves 22 and 30. A sharp drop in voltage such as this would normally produce a large negative pulse at point 26. However, because of the presence of diode 18, whenever the voltage level at point 26 becomes lower than ground the diode 18 conducts and, hence, the negative pulse is shorted out and cannot exist at the input to the amplifier. Hence, only the pulse 23 is generated at the amplifier input due to the leading edge of the sawtooth wave. If there is no signal input from audio signal generator 20, pulse 23 occurs at the point at which diode 10 conducts, said point being determined by the voltage at point 27 which is adjusted, for this embodiment, at 56 volts by means of variable resistor 12.

In order to vary the point in time at which pulse 23 occurs, an audio signal is introduced at the point 27 by audio signal generator 20 coupled to point 27 through condenser 11. The frequency of the audio signal is such that its period is very long in comparison to the width of the input pulse 21. Thus, as far as other signals present in the system are concerned the audio signal varies the D.-C. voltage level at point 27 very slowly. Because the D.-C. level at point 27 varies in accordance with the instantaneous amplitude of the audio signal, the point at which diode 10 conducts varies accordingly and, hence, the point in time at which pulse 23 occurs is dependent upon the instantaneous amplitude of the audio signal. Therefore, the system provides a pulse position modulation of the audio signal. In the embodiment shown, the audio signal may vary between maximum and minimum limits of $\pm 2$ volts. Since the linear rise of the sawtooth wave has a slope of 2 volts/microsecond, the position of the output pulse 23 is modulated over a range of $\pm 1$ microsecond depending on the instantaneous amplitude of the audio signal.

The particular values of elements and voltages described in Figs. 1 and 2 are not to be construed as limiting the scope of the invention. If a voltage having a frequency outside the audio range is to be used, the values of the elements used can be changed accordingly to bring about similar operation. For instance, the factors to be kept in mind are that the input pulses generated by generator 1 must reach amplitudes high enough to keep diode 6 in a non-conducting state for a long enough time to allow diode 10 to reach a conducting state to produce the output pulse 23 and the width of input pulses 21 must be kept small in comparison with the period of the modulating frequency that is fed into point 21 through condenser 11. The value of B+ voltage and the value of the time constant determined by resistor 7 and condenser 9 must be such that the leading edge of the sawtooth wave will have a large enough slope to cause a recognizable pulse at point 26 after the double differentiation. In addition the rise time of the sawtooth wave must be long enough to take care of variations in modulating voltage and still operate on the linear portion of the exponentially rising curve.

To counteract supply voltage variations it is preferable to use a single, regulated B+ supply to supply the voltage divider portions of the circuit and the audio generator 20. To prevent frequency distortion of the modulating signal it is preferable to reduce the shunting effect of the condenser 15 and inductance 16 by providing a low source impedance at the modulating signal input. However, if the source impedance is made too low the loading effect on the sawtooth wave becomes too great and the output pulse becomes unrecognizable. Therefore, a compromise is necessary between the loading down effect on the sawtooth generation system and distortion effect on the modulating signal source The value of source impedance may be chosen experimentally in accordance with the operating conditions desired.

While silicon diodes are shown in the previous explanation, other types of diodes including tube diodes can be used without limiting the scope of the invention. Other modifications may be made without departing from the spirit and scope of the invention. Accordingly, it is desired that this invention not be limited by the particular embodiment herein described except as defined by the appended claims.

What is claimed is:

1. A pulse modulator adapted to receive an input pulse comprising, in combination, supression means including a first diode for suppressing signals having relatively low amplitudes with respect to the amplitude of said input pulse, a first means including a second diode responsive to said input pulse for generating a first sawtooth signal, a second means including a third diode directly connected to and responsive to said first sawtooth signal for generating a second sawtooth signal at a predetermined time when said first sawtooth signal reaches a predetermined amplitude, said second means adapted to receive a modulating signal whereby said predetermined time varies in accordance with the instantaneous amplitude of said modulating signal, and differentiating means responsive to said second sawtooth signal for producing an output pulse at said predetermined time.

2. A pulse modulator adapted to receive an input pulse comprising, in combination, suppression means including a first diode for suppressing signals having relatively low amplitudes with respect to the amplitude of said input pulse, a first means including a second diode responsive to said input pulse for generating a first sawtooth signal, a second means including a third diode directly connected to and responsive to said first sawtooth signal for generating a second sawtooth signal at a predetermined time when said first sawtooth signal reaches a predetermined amplitude, said second means adapted to receive a modulating signal whereby said predetermined time varies in accordance with the instantaneous amplitude of said modulating signal, a differentiating means including a condenser and an inductance responsive to said second sawtooth signal for producing an output pulse at said predetermined time, and means including a fourth diode connected to said differentiating means for suppressing signals having an amplitude of opposite sign from that of said output pulse.

3. A pulse modulator adapted to receive an input pulse comprising, in combination, means for suppressing signals having relatively low amplitudes with respect to the amplitude of said input pulse, first means for generating a first sawtooth signal, second means responsive to said first said sawtooth signal for generating a second sawtooth signal at a predetermined time when said first sawtooth signal reaches a predetermined amplitude, second means adapted to receive a modulating signal whereby said predetermined time varies in accordance with the instantaneous amplitude of said modulating signal, and means responsive to said second sawtooth signal for producing an output pulse at said predetermined time.

References Cited in the file of this patent

UNITED STATES PATENTS

| | | |
|---|---|---|
| 2,438,927 | Labin et al. | Apr. 6, 1948 |
| 2,448,564 | Wilkerson | Sept. 7, 1948 |
| 2,490,026 | Buckbee | Dec. 6, 1949 |
| 2,616,044 | Schlesinger | Oct. 28, 1952 |
| 2,731,571 | Chance | Jan. 17, 1956 |
| 2,870,412 | Hern | Jan. 20, 1959 |
| 2,877,421 | Emanuelsson | Mar. 10, 1959 |
| 2,883,650 | Brockway | Apr. 21, 1959 |

FOREIGN PATENTS

| | | |
|---|---|---|
| 134,696 | Australia | Oct. 18, 1949 |